United States Patent Office 3,346,659
Patented Oct. 10, 1967

3,346,659
PRODUCTION OF CONJUGATED DIOLEFINES
John Lynn Barclay, Tadworth, and Edward James Gasson, Epsom Downs, England, assignors to The Distillers Company Limited, Edinburgh, Scotland, a British company
No Drawing. Filed June 2, 1964, Ser. No. 372,081
Claims priority, application Great Britain, June 13, 1963, 23,699/63
22 Claims. (Cl. 260—680)

The present invention relates to the preparation of conjugated diolefines from olefines.

Our British Patent No. 902,952 describes and claims a process for the production of a conjugated diolefine which comprises reacting a mono-olefine, the molecule of which contains a chain of not less than four carbon atoms, in the vapour phase with molecular oxygen over a catalyst comprising antimony oxide at an elevated temperature. The catalyst may comprise antimony oxide alone or in admixture with an oxide of a polyvalent metal. Suitable polyvalent metal oxides may be, for instance, the oxides of molybdenum, tin, tungsten or titanium.

According to the present invention a process for the production of a conjugated diolefine comprises reacting a mono-olefine, the molecule of which contains a chain of not less than four carbon atoms, in the vapour phase with molecular oxygen over an oxide composition containing antimony and one or more of the following metals; vanadium, chromium, manganese, cobalt, copper, nickel, zinc, gallium, germanium, arsenic, selenium, rubidium, yttrium, zirconium, niobium, ruthenium, rhodium, silver, indium, tantalum, osmium, iridium, platinum, thorium, thallium, bismuth and uranium, as catalyst.

The catalyst may be regarded either as a mixture of the oxides of antimony and at least one of the other metals specified or as a compound of antimony with one of the other metals specified and oxygen i.e. vanadium antimonate, cobalt antimonate, nickel antimonate, chromium antimonate, zinc antimonate or antimony uranate.

Under the reaction conditions the catalyst may be present in either or both forms. The catalyst may be prepared for instance, by intimately mixing the oxides of antimony or the hydrated oxide obtained by the action of nitric acid on antimony metal with an oxide of one of the other specified metals or a compound giving such an oxide on heating, for example the hydroxide, nitrate or basic nitrate. Alternatively the catalyst may be prepared by precipitation, for instance, by adding an aqueous solution of an antimony salt, e.g. the chloride, to an aqueous solution or suspension of a suitable salt, of one of the other metals, e.g. the acetate, citrate, chloride or nitrate, neutralising the mixture with ammonia and recovering the resulting precipitate.

By which ever method the catalyst has been prepared, it is desirable to wash the catalyst preferably with water, before drying.

The activity of the catalyst is frequently improved by a prior heat treatment, for instance at a temperature between 500 and 1100° C.

The catalytic composition of the present invention may, if desired, be deposited on a support such as silica.

In the process of this invention, a mono-olefine, whose formula contains a chain of not less than 4 carbon atoms, in admixture with a free oxygen-containing gas, is brought into contact with the catalyst in any suitable manner, for example in a fixed bed reactor or in a fluidised bed reactor. The proportion of mono-olefine in the feed may vary within fairly wide limits, but it is preferred to operate within the range 1% to 25% by volume. It is preferred to use butene-1 or butene-2, 3-methylbutene-1 or 2-methylbutene-2 as olefin starting material in the process, butene being converted to butadiene and the methylbutenes to isoprene.

The concentration of oxygen in the reaction mixture may vary within fairly wide limits, but it is preferred to operate with an oxygen concentration between 1% and 21% by volume of the reaction mixture. The feed preferably also contains a diluent which may be, for example, nitrogen or steam. It is preferred to use a mixture of nitrogen and steam as diluent, and the oxygen may thus conveniently be supplied in the form of air.

The reaction is preferably carried out at a temperature below 550° C. and particularly in the range 200° C.–500° C. The contact time may be, for example, within the range 1–30 seconds. The reaction may be carried out at atmospheric pressure, subatmospheric pressure or superatmospheric pressure.

The conjugated diolefines formed in reactions according to this invention may be recovered by any suitable means, for example by extraction into an organic solvent or by condensation, if necessary with refrigeration, and fractionation of the product.

The process of the invention is further illustrated by the following examples.

*Example 1*

Antimony pentachloride, 199.5 parts by weight, was added dropwise to a stirred solution of cobalt chloride ($CoCl_2 6H_2O$), 79.3 parts by weight in water, 100 parts by weight. The pH of the suspension was adjusted to 7 by the addition of 8 N aqueous ammonia solution. The precipitate was filtered off, washed three times by resuspension in water, 200 parts by weight, and dried at 110° C. for 16 hours. The dried powder was formed into tablets and heated for 6 hours at 440° C. in a stream of air. The catalyst was subsequently heated at 700° C. for 16 hours; the furnace temperature being raised from 300° C. to 700° C. at a rate of 21° C. per hour.

A mixture of, by volume 10% of butene-1, 60% of air and 30% of steam was passed over a bed of the catalyst in a reactor at 479° C. The contact time was 4 seconds.

Of the butene-1 fed to the reactor, 56% was converted into butadiene, 2.9% to butene-2 and 21.8% was recovered.

*Example 2*

A solution of nickel chloride ($NiCl_2 6H_2O$) 79.2 parts by weight, in water 200 parts by weight, was added to antimony pentachloride, 199.2 parts by weight, dissolved in concentrated hydrochloric acid (S.G.=1.18), 236 parts by weight. The solution was diluted with water, 200 parts by weight and the pH adjusted to 6 by the slow addition of 8 N aqueous ammonia solution. The precipitate was filtered off, washed three times, by re-suspension in water, 1500 parts by weight, and dried at 110° C. for 16 hours. The dried powder was formed into tablets and heated at 450° C. for 2 hours in a stream of air containing 10% by volume of ammonia. The catalyst was subsequently heated at 700° C. for 16 hours; the furnace temperature being raised from 300° C. to 700° C. at a rate of 21° C. per hour.

A mixture of, by volume, 10% of butene-1, 60% of air and 30% of steam was passed over a bed of the catalyst in a reactor at 478° C. The contact time was 4 seconds.

Of the butene-1 fed to the reactor, 47.6% was converted into butadiene, 3.2% butene-2 and 24.9% was recovered.

Example 3

Antimony pentachloride, 233.6 parts by weight, was added slowly to a solution of chromium trichloride

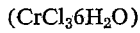

112.8 parts by weight, in water, 3000 parts by weight. The suspension was neutralized with ammonia (S.G.=0.88)

and stirred for 1 hour. The precipitate was filtered off, washed twice by resuspension in water 3000 parts by weight, and dried at 110° C. The dried powder was formed into tablets and heated at 700° C. for 16 hours.

A mixture of, by volume, 10% of butene-1, 60% of air and 30% of steam was passed over a bed of the catalyst at 490° C. The contact time was 4 seconds.

Of the butene-1 fed to the reactor, 62.8% was converted into butadiene, 5.3% to butene-2 and 9.2% was recovered.

Example 4

Antimony pentachloride, 239.2 parts by weight, was added slowly to a solution of uranyl chloride ($UO_2Cl_2$), 68.2 parts by weight in water 3000 parts by weight. The suspension was stirred for one hour, neutralized with ammonia (S.G.=0.88) and diluted with water, 1000 parts by weight. The precipitate was filtered off, washed twice by resuspension in water, 3000 parts by weight, and dried at 110° C. The dried powder was formed into tablets and heated at 850° C. for 16 hours.

A mixture of, by volume, 10% of butene-1, 60% of air and 30% of steam was passed over a bed of the catalyst at 500° C. The contact time was 4 seconds.

Of the butene-1 fed to the reactor, 71% was converted into butadiene and 7% was recovered.

Example 5

Antimony pentachloride, 199.3 parts by weight, was added slowly to a solution of zinc chloride, 45.43 parts by weight, in water, 3000 parts by weight. The suspension was neutralized with ammonia (S.G.=0.88) and stirred for one hour. The precipitate was filtered off, washed with water, 3000 parts by weight, and dried at 110° C. The dried powder was formed into tablets.

A mixture of, by volume, 10% of butene-1 60% of aid and 30% of steam was passed over a bed of the catalyst at 500° C. The contact time was 4 seconds.

Of the butene-1 fed to the reactor, 52.9% was converted to butadiene, 1.8% to butene-2 and 21.6% was recovered.

Example 6

Antimony powder, 42.5 parts by weight, was added slowly to stirred concentrated nitric acid (S.G.=1.42), 710 parts by weight, at 94–100° C. Indium metal 20 parts by weight, was added, the resulting mixture stirred for one hour at 94–100° C., and then evaporated to dryness. The residue was stirred for 30 minutes with water, 1000 parts by weight, and again evaporated to dryness. This procedure was repeated three times, the final residue being dried at 110° C. The dried powder was pelleted and heated at 825° C. for 16 hours, in a stream of air; the temperature of the furnace being raised from 300° to 825° C. at a rate of 21° C. per hour.

A mixture of, by volume, 10% butene-1, 60% air and 30% steam was passed over a bed of the catalyst at 480° C. The contact time was 4 seconds.

Of the butene-1 fed to the reactor, 51% was converted into butadiene and 30.5% was recovered.

Example 7

Antimony pentachloride, 239.2 parts by weight, was slowly added to a well stirred solution of manganese chloride ($MnCl_2 4H_2O$), 39.6 parts by weight, in water, 3000 parts by weight. The suspension was neutralized with ammonia (S.G.=880) and stirred for four hours. The precipitate was filtered off and washed by resuspension (3 times) in water, 1000 parts by weight, for one hour. The final filter-cake was dried at 110° C. and pelleted.

A mixture of, by volume, 10% butene-1, 60% air and 30% steam was passed over a bed of the catalyst at 480° C. The contact time was 4 seconds.

Of the butene-1 fed to the reactor, 49.5% was converted into butadiene and 34.3% was recovered.

We claim:

1. A process for the production of a conjugated diolefine which comprises reacting a mono olefine, the molecule of which contains a chain of not less than 4 carbon atoms in the vapour phase with halogen-free molecular oxygen over an oxide composition consisting essentially of the oxides of antimony and a metal selected from the group consisting of vanadium, chromium, cobalt, copper, nickel, zinc, gallium, germanium, arsenic, selenium, rubidium, yttrium, zirconium, iridium, platinum, thorium, thallium, bismuth, niobium, ruthenium, rhodium, silver, indium, tantalum and osmium and mixtures thereof as catalyst.

2. A process as claimed in claim 1 wherein the catalyst is vanadium antimonate.

3. A process as claimed in claim 1 wherein the catalyst is cobalt antimonate.

4. A process as claimed in claim 1 wherein the catalyst is nickel antimonate.

5. A process as claimed in claim 1 wherein the catalyst is chromium antimonate.

6. A process as claimed in claim 1 wherein the catalyst is zinc antimonate.

7. A process as claimed in claim 1 wherein the catalyst is prepared by intimate admixture of a substance selected from the group consisting of an oxide of antimony and the hydrated oxide of antimony obtained by the action of nitric acid on antimony metal with a substance selected from the group consisting of an oxide of one of the other specified metals and a compound giving such an oxide on heating.

8. A process as claimed in claim 7 wherein the compound is selected from the group consisting of the hydroxide, nitrate, and basic nitrate of the other specified metal.

9. A process as claimed in claim 1 wherein the catalyst is prepared by the addition of an aqueous solution of an antimony salt to an aqueous mixture of a salt of one of the other specified metals followed by neutralisation of the mixture with ammonia and recovering the resulting precipitate.

10. A process as claimed in claim 9 wherein the antimony salt is antimony chloride.

11. A process as claimed in claim 9 wherein the salt of the other metal is selected from the group consisting of the acetate, citrate, chloride and nitrate.

12. A process as claimed in claim 1 wherein the catalyst is heated before use at a temperature between 500 and 1100° C.

13. A process as claimed in claim 1 wherein the catalyst is deposited on a support.

14. A process as claimed in claim 13 wherein the support is silica.

15 A process as claimed in claim 1 wherein the mono olefine is selected from the group consisting of butene-1, butene-2, 3-methylbutene-1 and 2-methylbutene-2.

16. A process as claimed in claim 15 wherein the proportion of mono olefine in the feed is within the range 1–25% by volume.

17. A process as claimed in claim 1 wherein the concentration of oxygen in the reaction mixture is between 1 and 21% by volume.

18. A process as claimed in claim 1 wherein the reaction mixture contains a diluent.

19. A process as claimed in claim 18 wherein the diluent is a mixture of nitrogen and steam.

20. A process as claimed in claim 1 wherein the reaction is carried out at a temperature below 550° C.

21. A process as claimed in claim 20 wherein the reaction is carried out at a temperature between 200 and 500° C.

22. A process as claimed in claim 1 carried out at a contact time in the range 1–30 seconds.

References Cited

UNITED STATES PATENTS

| | | | |
|---|---|---|---|
| 3,094,565 | 6/1963 | Bethel et al. | 252—461 |
| 3,159,688 | 12/1964 | Jennings et al. | 260—680 |
| 3,207,806 | 9/1965 | Bajars | 260—680 |
| 3,207,807 | 9/1965 | Bajars et al. | 260—680 |
| 3,207,810 | 9/1965 | Bajars | 260—680 |
| 3,251,899 | 5/1966 | Callahan et al. | 260—680 |
| 3,257,474 | 6/1966 | Callahan et al. | 260—680 |

FOREIGN PATENTS 864,666   4/1961   Great Britain.

DELBERT E. GANTZ, *Primary Examiner.*

G. E. SCHMITKONS, *Assistant Examiner.*